United States Patent [19]

Schwartz et al.

[11] Patent Number: 5,204,911
[45] Date of Patent: Apr. 20, 1993

[54] INSPECTION METHOD USING UNIQUE TEMPLATES AND HISTOGRAM ANALYSIS

[76] Inventors: Nira Schwartz; Arie Shahar, both of 2800 Plaza Del Amo #187, Torrance, Calif. 90503

[21] Appl. No.: 706,800

[22] Filed: May 29, 1991

[51] Int. Cl.$^5$ .............................. G06K 9/00
[52] U.S. Cl. ......................... 382/8; 356/240; 358/106; 382/30; 382/51
[58] Field of Search ............ 382/8, 18, 51, 30, 7; 209/939, 522; 356/240, 237; 250/223 B; 258/101, 106, 107

[56] References Cited

U.S. PATENT DOCUMENTS

| | | | |
|---|---|---|---|
| 4,231,014 | 10/1980 | Ponzio | 382/7 |
| 4,637,054 | 1/1987 | Hashim | 382/8 |
| 4,759,074 | 7/1988 | Iadipaolo et al. | 382/8 |
| 4,809,342 | 2/1989 | Kuppner | 358/107 |
| 4,859,863 | 8/1989 | Schroder et al. | 382/8 |
| 4,995,091 | 2/1991 | Shimbara | 382/51 |
| 5,007,096 | 4/1991 | Yoshida | 382/8 |

Primary Examiner—Joseph Mancuso
Attorney, Agent, or Firm—David Pressman

[57] ABSTRACT

A technique for detecting defects in stationary products or in products moving on a production line (102, FIG. 12) by analyzing their images uses a matrix or line-scan camera (104, FIG. 12) for taking images of products (102). The product's dimensions are measured with accuracy and the sizes and positions of their surface defects are determined. The technique is much faster and more accurate than current techniques and is based on an analysis of the histogram of the full image (C, FIG. 2). A carefully selected template image (A, FIG. 1) is created and saved in the memory of a computer (106, FIG. 12). The method also includes the steps of: creating and saving a histogram vector of the template image; loading look-up tables with a shifting and quantizing function for the image gray levels; saving a product image in memory to be superposed onto template image (FIG. 1); creating and saving a histogram vector of the result superposed image; analyzing the resulting histograms, i.e., finding discontinuations, changes the values of gray levels, appearance of new gray levels, etc. This results in the detection of product dimensions or surface defects and allows deciphering of product codes.

29 Claims, 10 Drawing Sheets

E Gray Level = 14
D Gray Level = 11

D Gray Level = 9
B
FIG 11(b)

INSPECTION METHOD USING UNIQUE TEMPLATES AND HISTOGRAM ANALYSIS

BACKGROUND

1. Field of the Invention

The invention relates generally to the field of quality control, particularly to the inspection, measuring and sorting of products moving on a production line, so that, based upon the results of the inspection, the products are either accepted for use or rejected.

2. Prior Art

Many mass produced products must be inspected prior to shipment. E.g., beverage bottles must be inspected for flaws prior to filling to prevent breakage in use and consequent lawsuits, injuries, property damage, etc. Heretofore one method of inspection has been manual: an inspector simply observes the bottles passing by on an assembly line. However manual inspection is fraught with defects principally due to inspector inattention, fatigue, slow throughput, etc. Thus automated inspection machines have come into vogue.

Today one automated inspection machine analyzes images of bottles by means of video cameras and computers. Products of more complicated structure, such as screws, require several image inspection steps. The images taken by the video camera are stored in the memory of a computer in one of several standard formats which depends on the type of the camera used for taking those images. For example, an industrial solid state camera manufactured by Panasonic, Inc. under model GP-CD60, has a resolution of 649(H)×491(V) pixels, i.e., 491 lines by 649 pixels per line for an image. A pixel is the smallest element of an image that can be individually processed in a video display system. Different formats are used in Europe.

Normally a pixel-based product inspection system contains a source of light that illuminates the product being inspected. Usually the light has a specific wavelength. Some products are more transparent to light than others, e.g., some can be made of colored glass, others from an opaque material. Most of the video cameras used for inspection are industrial cameras which are able to take more than b 30 images per minute, which is a standard. A memory for storing images must be sufficient to hold image gray levels, and the computer must be fast-acting to ensure quick analysis of the image. (The same method can be implemented for stationary products).

There are also line cameras which utilize line sensors. The lines are analyzed with, e.g., 512 or 1024 pixels. In this system, images of the products being inspected are stored in a computer's memory and analyzed by means of an algorithm, also stored in a computer's memory. The purpose of such control is to determine whether the products have defects and whether the defects are within allowable limits. Another purpose is to determine the locations of the defects in the product's material. However, line-by-line algorithmic analysis of defects and their locations is a slow and time-consuming procedure.

Still another method of inspecting images is the use of histograms of full images. This technique has the advantage of quick results, since in most cases image-processing equipment calculates the function in computer hardware. A histogram of a full image is defined as a vector and the data is stored in each location of the vector. The histogram vector length equals the number of gray levels in an image. The data in each vector location is the number of pixels for that particular gray level in the picture. Standard cameras use 128 gray levels to express the full range of light intensity, i.e., in this case the histogram vector length will be 128 locations. Each pixel in the image can have a definite gray level value, i.e., one out of the range of levels between 0 to 127. The length of the histogram vector is equal to the number of gray levels in the image.

In the above example the histogram length is 128. E.g., the value stored in location 77 of the histogram vector will indicate the number of pixels in the image which has a gray level value of 77.

The histogram-based technique is indeed much faster than line-by-line inspection. However, it produces inaccurate results and does not allow the determination of the locations and magnitudes of individual defects in the products. Another problem associated with the histogram technique is its high dependence on the ability of finding the geometrical centers of the products. For example, when inspecting bottles, it is first necessary to calculate the location of each bottle's center.

Today industry increasingly demands higher-speed inspection techniques. Some production lines operate with an output of 2000 products per minute and with the time interval for inspecting a product as short as 30 milliseconds. Therefore a strong demand for fast and efficient image inspection algorithms exist.

OBJECTS AND ADVANTAGES

Accordingly, it is an object of the invention to provide an improved method for inspecting, measuring, and sorting products in order to find defects which may be present in such products, while they are moving on a production line.

Other objects are to locate individual defects in the products and to determine whether they are within a desired accuracy range, to locate positions of the defects on the full image of the product using pixels as basic elements, to evaluate defects quantitatively, i.e., to determine the number of pixels associated with defects in a full image of product, to determine defects of the products in terms of their dimensional accuracy, to provide quality control of such products as glass or plastic bottles, the threaded neck(s) of bottles, or other parts of bottles, to accelerate inspection results, and to carry out quality control of products on a real-time basis with the use of computer techniques. Still further objects and features of the invention will be apparent after consideration of an ensuring description and accompanying drawings.

GENERAL DESCRIPTION OF THE METHOD

The method of the invention in general consists of the following sequential steps:

(1) A template is created and is saved in memory in the format of an image.

(2) A histogram of the template is generated and saved.

(3) An image of a product is created.

(4) A modified product image is created by converting gray levels by shifting and/or quantizing once or plurality of times.

(5) The results are saved in memory.

(6) The modified image and the template image are superposed.

(7) A histogram of the result of the superposition is created and saved.

(8) The histogram vectors are analyzed to:
(a) detect defects,
(b) estimate defect physical sizes,
(c) evaluate product dimensions, and
(d) detect code marks Each of the above steps will now be considered separately in detail.

FIG. 1

Creation of Template Image

Figure 1:
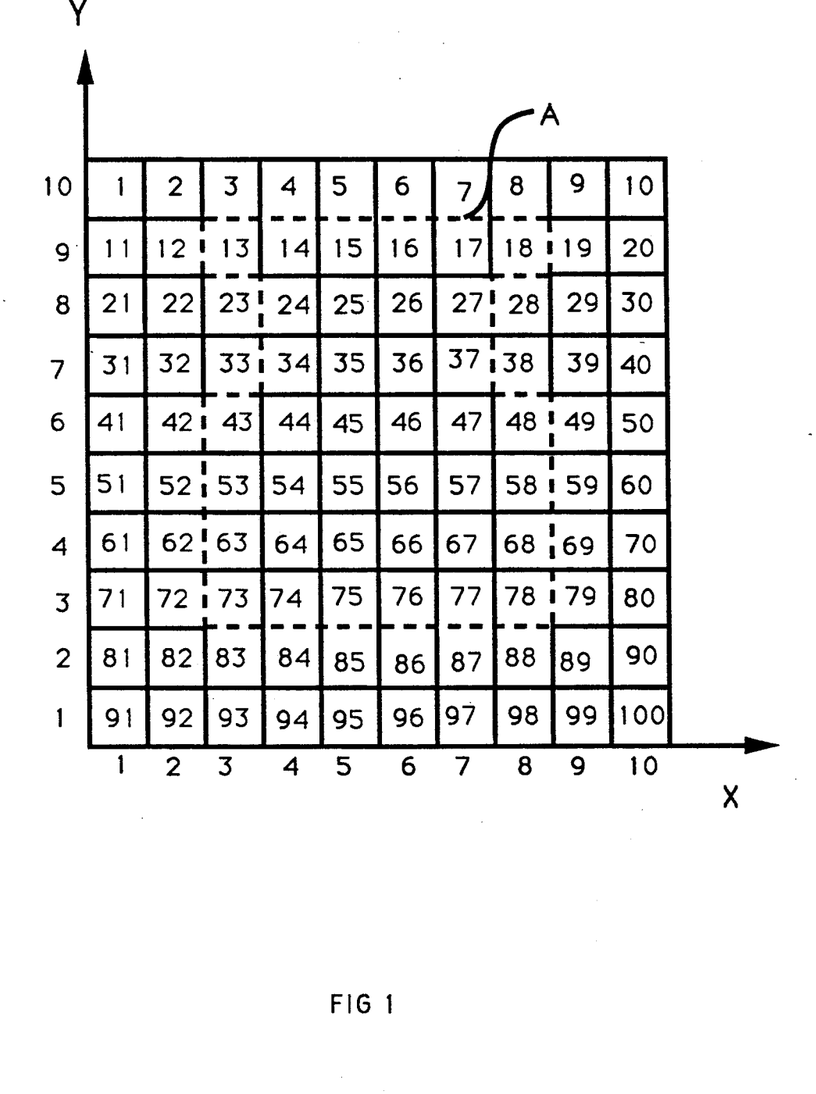
FIG. 1 is a diagram illustrating a template image related to an inspection machine according to the invention.

FIG. 1 demonstrate the first step of the method of the invention, i.e., the creation of a template image. A template image is not taken by a camera. It is an artificial image created by the computer and stored in the memory.

The first step of the method is to create the template in an image format and save it in a memory. The template is first created and then it is superposed with a product image that will be described later. The template has to be designed very carefully. so as to highlight the features in the image product of interest and make it possible to come up with the features which can be analyzed by a histogram vector, e.g., the product's dimensions and the sizes of its defects. The sizes and their locations are typical features for analysis. Usually it takes the computer a great deal of time to create the template image. Like a real image stored in the memory, it will have memory addresses related to pixels where gray levels values are stored. The template's pixel's gray level values are carefully selected and will be used in a real-time inspection processes. The gray levels of the template image's pixels do not necessarily resemble the gray levels of the product image.

The template image is carefully designed to influence the values of the histogram vector in such a way that dimensions of the product, or the defects of the products, are easily determined out by analyzing the histogram vector, as will be explained by an example later.

In the case shown in FIG. 1, the template is an image with 10 pixels on the abscissa (X) by 10 pixels on the ordinate (Y), i.e., 100 pixels total. The template has carefully chosen gray levels. The template's gray levels cover a range from 0 to 100. If necessary, a much higher graduation can be used. In the illustrated example, no two pixels have the same gray level. Therefore the histogram vector will be the following: (0,0), (1,1), (2,1), (3,1), . . . , (99,1), and (100,1). The graph of the histogram (not shown) will be a line parallel to the abscissa, i.e., along the abscissa (X) from 0 to 100, while ordinate (Y) will correspond to 1. The dashed line A indicates a position of the product of FIG. 2 on the template of FIG. 1. This line is imaginary and does not belong to the template. It is drawn to make it easy to see borders of the pixels in the template area that will be superposed with the correlated pixels on the product's image.

Another version (not shown) of this template can be created where each pixel is actually a group of pixels. In reality, the number of pixels in the image is on the order of 25,000 and the number of gray levels is only 128. Therefore some pixels will have to have the same gray level. In other words, it is impossible to have a template in which each of the pixels has a different gray level.

FIG. 2

Image of Product

The next step is obtaining an image of the product to be inspected. This is a real-time temporary image taken by a camera and stored in memory. Each memory location can be accessed by a fast computer to analyze the image stored in the memory. FIG. 1 shows an image of a product C. The whole process of product image acquisition is repeatable for each product on the production line. Each new image product taken by the camera overwrites the previous image in the memory.

In most cases the product is inspected while moving on a production line, so that its image is taken when it is in motion.

For the purpose of simplicity, the image is schematically shown in the coordinate system or template of FIG. 1, which, as stated, has 10 pixels on abscissa X and 10 pixels on ordinate Y. Also for the sake of simplicity, the image is shown as a bottle or container in black-and-white. Most standard black-and-white cameras have 0 to 127 gray levels of intensity, as has been mentioned above.

Figure 2:
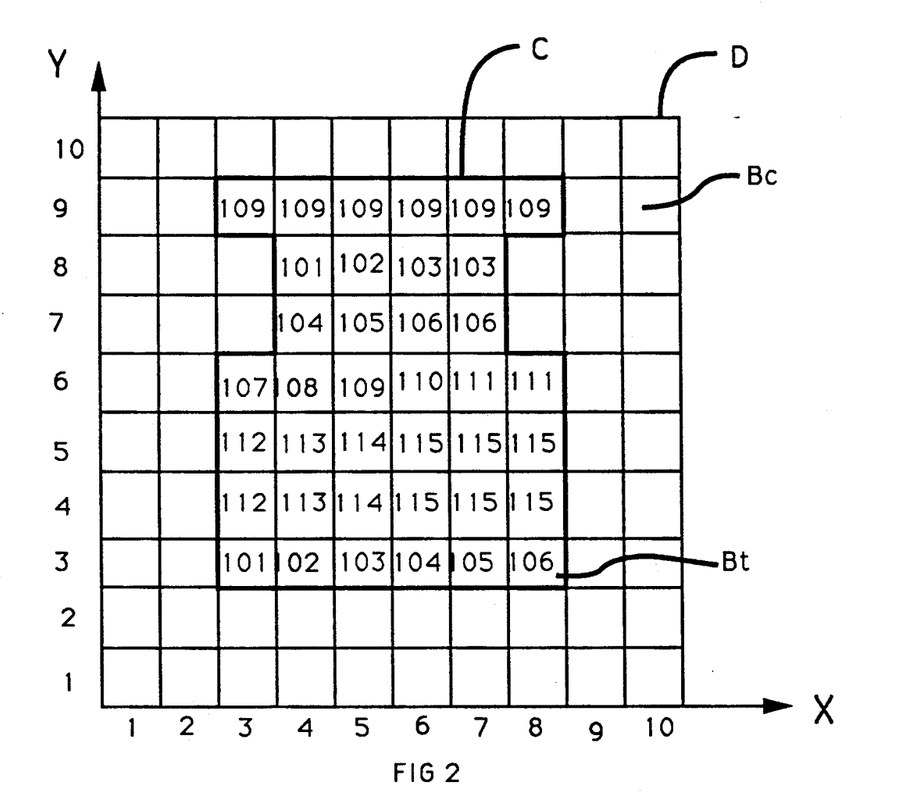
FIG. 2 is a pixel-based representation of an image of a product related to invention.

Each pixel is referred to by a set of coordinate values (X,Y,Z), where X is the abscissa, Y is the ordinate, and Z is a gray level. The full intensity that the camera is able to represent is divided into 128 levels. Each pixel has an intensity that is a portion of the maximum intensity and is represented by a corresponding gray level. FIG. 2 shows the gray level values for each pixel by three-digit numbers on the product's image. The background D of the product has a zero (0) gray level. One of such background pixels is designated in FIG. 2 by symbol Bc. The coordinates of this pixel are (10,8,0). In a similar manner, a pixel Bt (FIG. 2), which is on the bottom of the product, is designated by the coordinates (8,3,106).

It is not by coincidence that the gray level in FIG. 2 starts from a Z=101 value. Naturally the gray levels of the product vary throughout a full gray-level range, e.g., in our example, from 0 to 127. According to the invention, however, the gray levels of the product shown in FIG. 2 are shifted upward with respect to the background. Thus the smallest gray level on the product image, i.e., Z=101, is higher than the highest gray level on image template, which will be described later, i.e., Z=100 (FIG. 1). Also according to the invention, the color of the background is a plain color and is expressed by one gray level, in the illustrated case by gray level Z=0.

FIG. 3

Histogram Diagram of FIG. 2.

Figure 3:
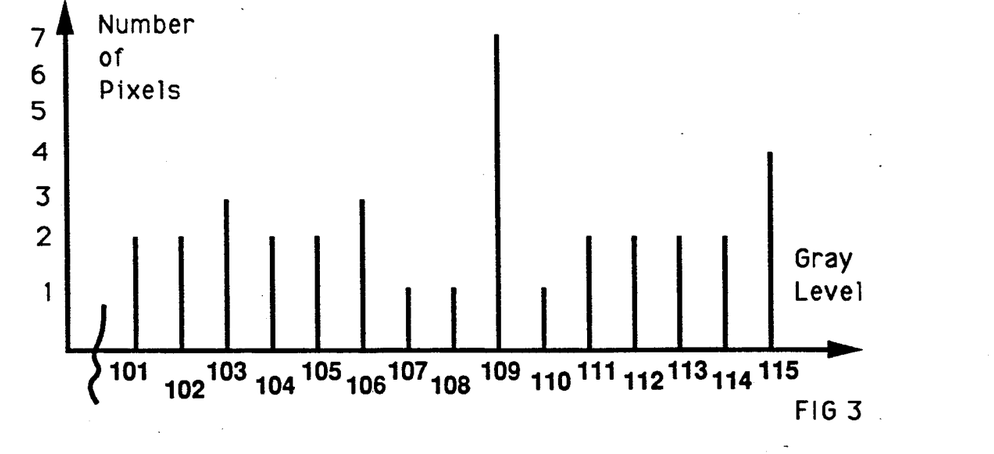
FIG. 3 is a histogram of the image of FIG. 2.

The histogram diagram of FIG. 3 is a plot of a histogram vector of the image of FIG. 2. The histogram vector will represent a full image. Since we are using a standard gray level camera with 128 gray levels of intensity, the length of the histogram vector will correspond to 128 locations. Abscissa X indicates gray levels. Ordinate Y indicates number of pixels related to specific gray levels. The diagram starts at abscissa X with a gray level value 101, i.e., it starts from a meaningful value of the diagram. For example, the histogram shows gray level 103 with an ordinate of 3. This means that the full image has three pixels with gray level 103. The coordinates of these pixels are the following: (6,8,103), (7,8,103), and (5,3,103). The histogram vectors have 128 locations, but not all of them will be loaded with data. At position 103, the value of the histogram vector will be 3. Locations 1 to 100 will have a zero value (0), since there are no pixels in the image with gray levels of that magnitude.

The full histogram vector is the following: (0,68), (1,0), . . . , (101,2), (102,2), (103,3), (104,2), (105,2), (106,3), (107,1), (108,1), (109,7), (110,1), (111,2), (112,2), (113,2), (113,2), (114,2), and (115,4). The first pair of values indicate that there are 68 pixels with a gray level value of 0. However, analysis of such a vector does not yet allow us to obtain any valuable data, e.g., the product's dimensions. To achieve this objective, other steps, which are described below, are necessary.

SHIFTING AND QUANTIZING

The shifting of gray levels is essential to the invention. The shifting is done to prevent bigamy of gray levels when the shifted image and the template are superposed, as will be shown later.

The shifting of the gray level values of the image product can be easily done in real time with the use of existing hardware, known as look-up tables. These tables automatically convert each gray level to another, or back to itself. Usually data of those tables are loaded at the startup of the computer. This data defines the conversion function and can be changed in real time. For reference see the operating manual, "Look-Up Tables", Technical Publications Department, 1990, Image Technology, Inc. Woburn, Mass. The look-up tables are also capable of quantizing the image gray levels. The look-up tables are loaded with a transform function that converts gray levels between two values to a third value. E.g., all gray levels between 1 to 20 in the image will be stored as gray level 0.

FIG. 4

Superposition of Product and Template Images

Figure 4:
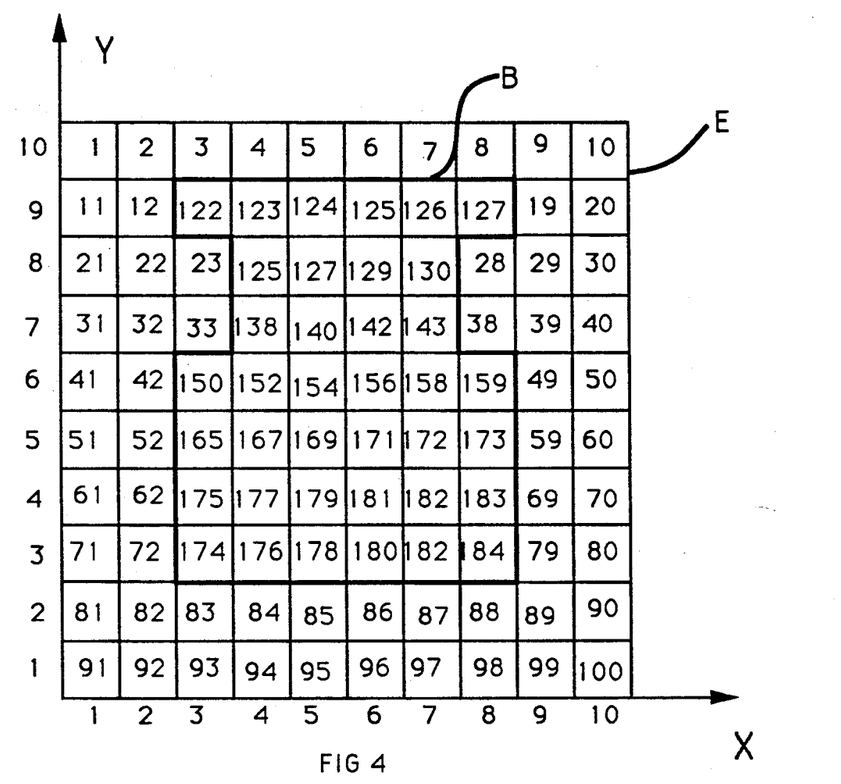
FIG. 4 is a diagram showing an image obtained as a results of superposition of two images according to the invention.

In order to determine the dimensions of product C (FIG. 2), its image is superposed onto the image of the template shown in FIG. 1. FIG. 4 shows the results of superposition of the two images. The superposition is the summation of gray levels for equally addressed pixels of the two images. The product's borders are designated by line B and background E.

In contrast to the product image, which is temporary and is stored in the computer memory on a real-time basis each time the product is inspected, the template image is created beforehand and is permanently stored in the computer for as long as the inspection process is carried out. The product image background gray level is zero (0).

For example, if a pixel a pixel inside product boundary C, e.g., pixel (3,3,101) of FIG. 2, is superposed onto pixel (3,3,73) of FIG. 1 the following coordinates will result: (3,3,174). I.e., for the same coordinates X=3, Y=3, we get a gray level Z=101+73=174.

The superposition of a pixel outside the product image boundary C, e.g., pixel (2,3,0) of FIG. 2, onto pixel (2,3,72) of FIG. 3, will result in the following coordinates (2,3,72). I.e., for the same coordinates X=2, Y=3, we got a gray level Z=72+0=72.

Superposition of all pixels equally addressed on the two images will result in a third image, shown in FIG. 4. The third image will have the product boundaries designated by line B. Within these boundaries, the pixels will have gray levels that are shifted linearly to higher values than the gray levels of the product's background E. The product's background gray levels on the third image will be identical to those of the template. This is because in this area, the gray levels of the template were superposed with the zero (0) value of the image gray level.

The result assures that on the third image (FIG. 4), the gray levels of the pixels inside the product's boundaries B will have no common values with gray levels outside the product boundaries that belong to background E. This means that there is no confusion between gray level values on the product's surface and its background. This fact is used in the subsequent histogram analysis.

FIG. 5

Histogram of Image of FIG. 4.

Figure 5:
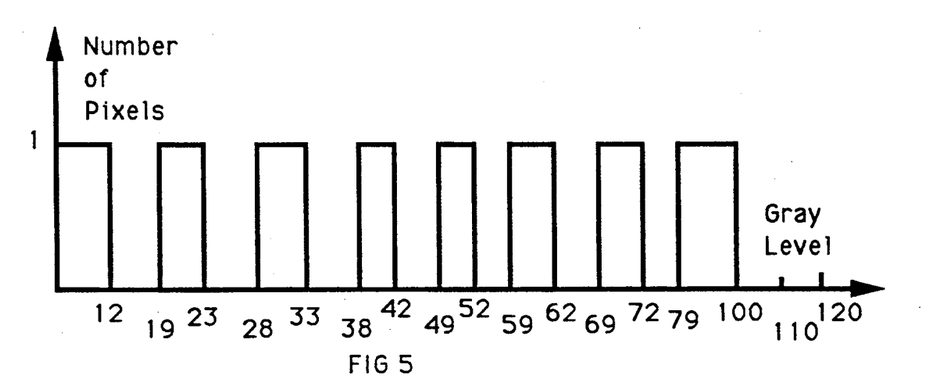
FIG. 5 is a histogram of the image of FIG. 4.

The results of the superposition process (FIG. 4) are used as a basis for building the histogram shown in FIG. 5. This diagram illustrates a great advantage of the present method over current techniques in that it shows how the method efficiently and quickly analyzes the full image. The ability to calculate the dimensions of the product is based on the analysis of histogram vectors which can be done very quickly as the vectors are very short. The length of the histogram vector is equal to the number of gray levels in the image FIG. 4, and most of the time it is of an order of 1024. In case of conventional, pixel-by-pixel analyzes of the full image, the total number of pixels in the image would have to be analyzed. This would be equivalent to a vector on the order of 512×512, i.e., on the order much higher than a single histogram vector.

In the range of gray levels lower then 100, histogram values equal to 1 correspond to pixels of the template that have not changed their gray levels during the superposition process. This is because these pixels were superposed with pixels of zero gray levels corresponding to the background of the product image. The histogram values equal to 0 indicate the absence of such gray levels, e.g., the gray levels between 13 to 18 have no pixels of such gray levels. However, pixels of such gray levels are present in the template image. A superposition operator, which is a summation of gray levels values at equal addresses of the template and product images, shifts the gray level of these pixels to higher values, i.e., 122 to 127 (FIG. 4). The superposition onto other pixels did not create gray levels 13 to 18 since the template gray levels were carefully preselected to be less than 100. The product pixels bounded inside contour C (FIG. 2) have gray levels that have been shifted to values higher than the gray level of the template, i.e., to a level of 101 or higher.

The histogram values between gray level of $Z=0$ to $Z=12$ correspond to 1, while histogram values between $Z=13$ to $Z=18$ correspond to 0. The number of 0 gray levels between $Z=13$ and $Z=18$ is equal to 6. The same number corresponds to pixels along the top of the product. This means that the dimension of the product at the top is equal to 6 pixels (FIG. 4). Similar analysis for the rest of the histogram makes it possible to evaluate the rest of the product's dimensions.

FIG. 6

Line Template Image

Figure 6:
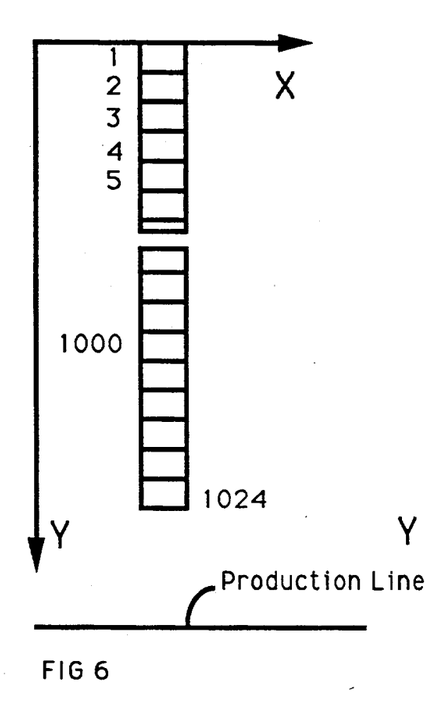
FIG. 6 is a diagram showing a line-scan image template related to the invention.

Another type of template which can be used in the inventive method is a line template. This template is used when there is a need to measure the product's height. FIG. 6 shows a line template image T. This template is to be superposed with a line image taken by a line sensor. The length of the line can be as high as 1024 pixels, or more. However, the diagram shows only the beginning and the end of the 1024 pixels. Abscissa X and ordinate Y are references for measurement. According to the invention, the gray levels of the template must be chosen very carefully. In the illustrated case, the procedure is very simple as the levels of all 1024 pixels are selected with a gray level of 1. The histogram vector of such a template will also be very simple. All of locations 2 to 1024 in the histogram vector have a data value equal to zero (0), while location 1 of the histogram vector, which corresponds to gray level 1, has a data value of 1024.

FIG. 7

Height Measurement

Figure 7:
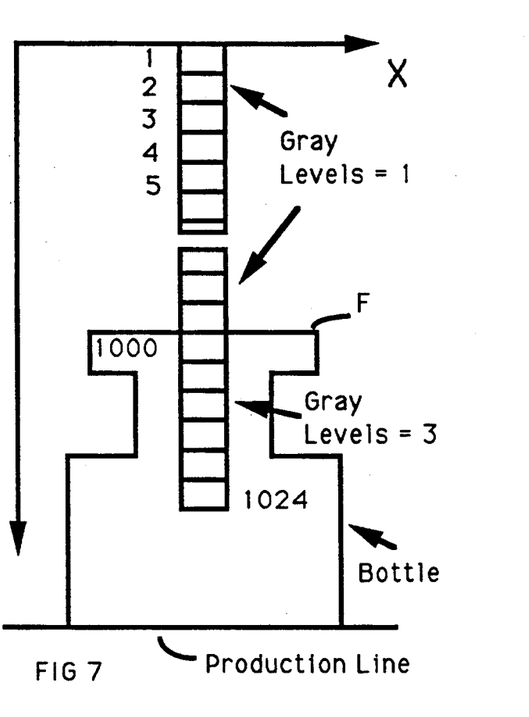
FIG. 7 is a diagram illustrating the height measurement of a product.

FIG. 7 shows the superposition of the images, i.e. the template image of FIG. 6, and a product's image designated by contour line F. The product's image gray levels are shifted twice. The first shifting is to higher values than the template gray levels, e.g., to 2 to or higher, (similar to the case described with reference to FIG. 1). For simplicity we can quantize the gray level of all pixels of the product bounded inside line F to be equal to a value of 2 and outside this range to be equal to zero (0). This can be done by hardware with the use of the above-mentioned look-up tables at the stage of image acquisition and before storing the image in the memory.

The second gray level shift is a result of the superposition of the template onto the product images. After the superposition, all pixels from 0 to 1000 will still have a gray level of 1, while pixels from 1001 to 2024 will have a gray level of $3=1+2$.

The histogram vector of the result of the superposition process (image of FIG. 7) is very simple. All the values at vector locations 2 and 4 to 1024 will be equal to zero (0), while at position 1, which corresponds to gray level 1, the value will be equal to 1000. In position 3 (corresponding to gray level 3) the value will be 24. This is because 24 pixels are inside the boundaries of contour line F. There will be no gray level 2, since it was shifted to value 3 as a result of the superposition.

The histogram value at vector location 1 gives immediately the number of pixels between the reference level and the top of the product. This method of taking the height measurement relative to a reference (coordinate X) not far from the top of the product has the advantage of improving measurement accuracy. This is because, irrespective of the size of the product, all 1024 pixels are represented by a short distance.

After the dimension measurement, if the product is found to have an intolerant height or width, it will be rejected.

FIG. 8

Detection of Thread Defects

Figure 8:
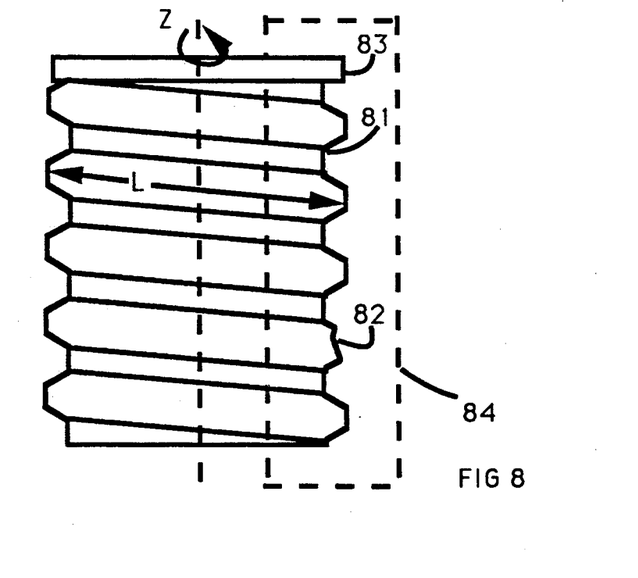
FIG. 8 is a diagram illustrating a threaded neck of a bottle as an object of inspection.

FIG. 8 illustrates the detection of defects on a threaded neck.

FIG. 8 is a schematic image of a thread 81 with a bottle top end 83. The threaded portion is a body of revolution and has an axis of symmetry Z. Threads are used in many different products. E.g., in glass bottles, threads are used to close the bottles. However glass threads are fragile and hence breakable. In case a bottle thread has a missing chip 82, the chip must be detected and the bottle rejected from the production line. Because of the high rate of production of bottles, and in view of the special geometry of glass threads, such defects are very difficult to detect. According to conventional techniques, the glass thread image is inspected over its entire length. This gives poor results.

FIG. 9(a)

Strip Template Image

Figure 9A:
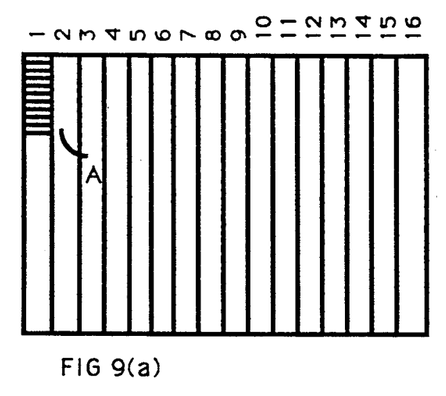
FIG. 9(a) is a diagram showing a strip-type template image related to the invention.

According to the invention, defects on the threads are detected by analyzing their profile. In this case the template image shown in FIG. 9(a) is arranged perpendicularly to axis Z (FIG. 8) and in the plane of the drawing. With 128 gray levels, we can have 127 strips (1 to 127, value 0 is excluded). For simplicity of the template image, only sixteen strips are shown on the template in FIG. 9(a). Each strip of the template is one line wide, but can be wider. Each strip is of a different constant gray level. The gray levels of the strips are from 1 to 16, as shown in the drawing. The first strip has gray level 1 and its pixels are shown as A. The second strip has gray level 2, and so on.

Each strip of this template can be checked individually in the same manner as has been described with reference to FIGS. 6 and 7.

FIG. 9(b)

Thread Image

Figure 9B:
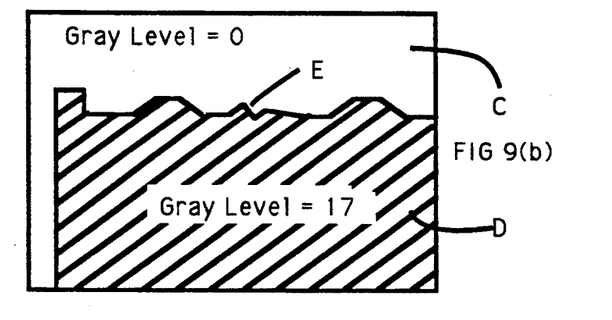
FIG. 9(b) is a diagram showing a threaded neck of a bottle's image.

The product image is the image of a threaded profile, and is taken within the boundaries of an area shown by broken line 84 (FIG. 8). In FIG. 9(b) image background C has gray levels corresponding to (0). This is done by quantizing or shifting the gray levels, or by providing a white background. The gray levels of product D are first shifted to a value higher than that of the template (FIG. 9(a)), i.e., higher than 16. In our example they are shifted to level 17. Focusing the camera to the profile area bounded by line 84 will give to this area the full power of the camera and therefore increase resolution. A defect on the threads is shown as E.

FIG. 9(c)

Superposition of Product Image of FIG. 9(b) and Template Images of FIG. 9(a).

Figure 9C:
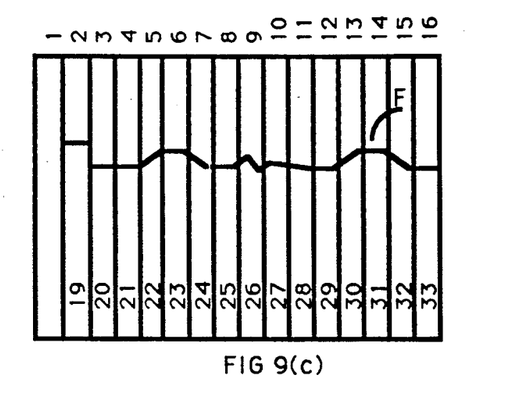
FIG. 9(c) is a diagram showing result of superposition of the product image of FIG. 9(b) and the template image of FIG. 9(a).

The result of the superposition of images of FIGS. 9(b) and 9(a) are shown on FIG. 9(c). The resultant superposed image FIG. 9(c) is used for detecting the threads' defects; The analysis is the same as has been described earlier. The product is shown by contour line F. The second gray level shift is a result of the superposition of the template and product images. The shifted gray level strips are shown on FIG. 9(c) to be from 19 to 33. Outside contour F the gray level strips are equal to the original values of the template. These are shown as values 1 to 16. This is because they were superposed with a gray level of value of zero (0) on background C (FIG. 9(b).

FIG. 9(d)

Histogram of Template of FIG. 9(a)

Figures 9D, 9E:
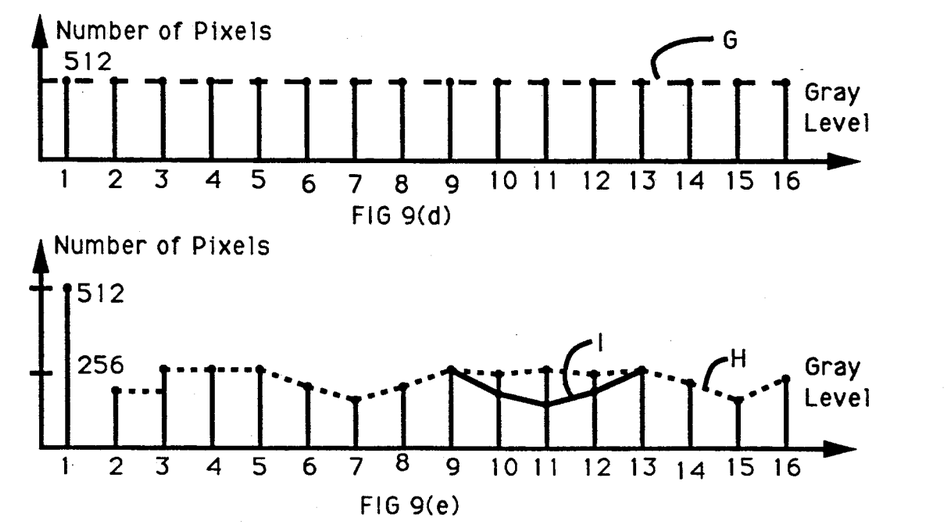
FIG. 9(d) is a diagram showing a histogram of the template of FIG. 9(a).
FIG. 9(e) is a histogram of the image of FIG. 9(c).

The diagram of FIG. 9(d) shows the histogram of the template of FIG. 9(a). Each strip of the template is 512 pixels long, and one pixel wide. Therefore the number of pixels for each gray level will be 512×1=512. The histogram vector will have 16 locations in the length direction, and the data in each location will correspond to 512. This vector is represented by straight line G, the value for each one of the sixteen gray levels from 1 to 16.

FIG. 9(e)

Histogram of Image FIG. 9(c) and Detection of Defects

The diagram of FIG. 9(e) is the histogram of C (FIG. 9(c)), i.e., the histogram of the result of the superposition of images A and image B (FIGS. 9(a) and 9(b)). The diagram shows only gray levels from 1 to 16. The same results can be achieved by analyzing the rest of the histogram vector. The first strip with gray level 1 on the superposed image FIG. 9(c) is not changed. Therefore the number of pixels with gray level 1 stays unchanged, i.e., at a value of 512, and is shown as the first gray level value in FIG. 9(e). Dashed line H is the envelope of all the rest of the values representing the histogram. The dashed line represents the profile of the actual thread. Solid line I represents the profile of a thread without defects. By comparing the solid line with the dashed line it is easy to indicate that there is a defect around gray level 11, i.e., around the 11th strip from the top of the image.

As many profile images of the threads as possible must be used. Assume that the camera takes 30 images per second, the circumference of the beverage bottle is about 80 mm, and it spins around axis Z. In this case the profile image of the tread can be taken every (80/30)=2.6 mm of its circumference, which is enough to detect defects much smaller than 1 mm deep.

FIG. 10(a)

Ring Template

Figure 10A:
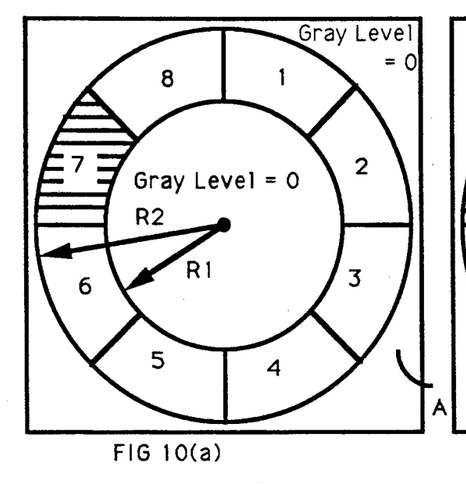
FIG. 10(a) is a diagram showing a ring template related to the invention.

Defects on the bottle's end or "finish" are determined with the use of a ring-like template of the type shown in FIG. 10(a). In this example template image A consists of a background with a gray level of zero (0) and a ring with boundary radii R1 and R2. The ring is divided into 8 sections, 1 to 8, as shown. The gray level of each of the sections is identical to the section number. Section 7 is designated with a gray level equal to 7. Section 7 is emphasized by diagonal lines for easy reference.

FIG. 10(b)

Image of Finished Surface

Figure 10B:
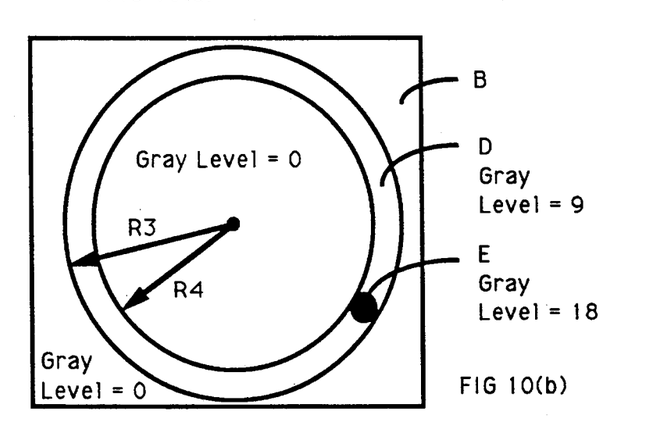
FIG. 10(b) is a diagram showing an image of a finished of a bottle related to the invention.

FIG. 10(b) shows an image B of the bottle end or "finish"D, i.e., a top view of rim or end 83 of FIG. 8. The end is bounded with radii R3 and R4. The first shifting of the gray levels of this image is as follows: the background gray level is quantized to gray level zero (0) (as shown in the drawing), area D is shifted and quantized to gray level equal to 9 (higher than the ring template gray levels), and defect E is shifted and quantized to gray level 18 (higher than 9+8=17).

FIG. 10(c)

Superposition of Image of FIG. 10(b) and Ring Template of FIG. 10(a)

Figure 10C:
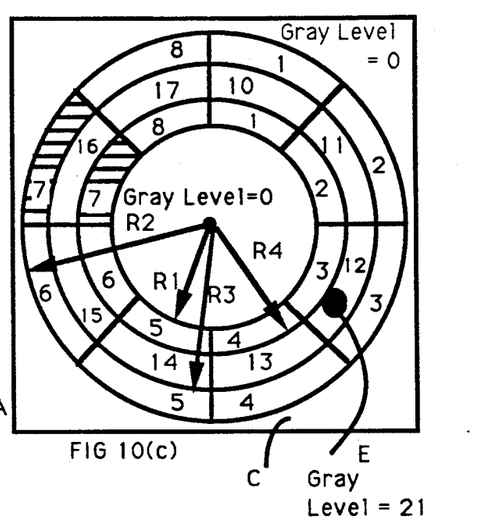
FIG. 10(c) is a diagram showing a result of superposition of the finished image and the ring template.

FIG. 10(c) shows the results of the superposition of template image A of FIG. 10(a) and image B of FIG. 10(b). As a result of such superposition, bottle end 83 of FIG. 8 is shown as a ring bounded between circles having radii R3 and R4.

In a similar manner, the template is shown as a ring defined by circles having radii R1 and R2, where R2 is greater than R3 and R1 is greater than R4. This ring is divided into sections 1 to 8, with gray levels 1 to 8, respectively.

As a result of the supposition, each of original gray levels 1 to 8 is shifted. Original emphasized section 7 (with gray level 7, image A) is now converted into two sections of gray level 7 and one section of gray level 16, as shown in FIG. 10(c), image C. Portions with gray level 7 on image A were not shifted by superposition as the background gray level as image B is equal to (0). Portions with gray level 7 on image A were shifted by the superposition to gray level 16, i.e., 7+9=16 (gray level 7 on the template image was added to gray level 9 on the finish image). The same procedure used on section 7 led us to the rest of the gray levels shown on the drawing. After the superposition process, defect area E will be shifted to gray level 21, (3+18=21, i.e., gray level 3 on the template image was added to gray level 18 on the finish image).

FIG. 10(d)

Histogram of Ring Template of FIG. 10(a)

Figures 10D, 10E:
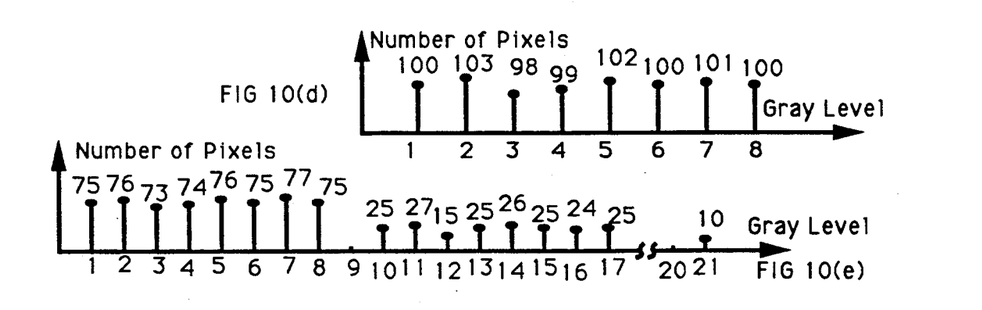
FIG. 10(d) is a histogram of a ring template.
FIG. 10(e) is a histogram of FIG. 10(c) the result of superposition image of FIGS. 10(a) and 10(b).

FIG. 10(d) shows a histogram of the ring template FIG. 10(a). Each template section is composed of a number of pixels. There may be fluctuations in the number of pixels between sections. However these fluctuations will not influence the inspection, since the histogram of the template itself will give the precise number of pixels for each section. As shown in the drawing, the first section with gray level 1 has 100 pixels. The second section with gray level 2 has 103 pixels, and so on.

FIG. 10(e)

Histogram of FIG. 10(c) the Superposed Image

The diagram of FIG. 10(e) is the histogram of C (FIG. 10(c)), i.e., the histogram of superposition of images A and B, (FIGS. 10(a) and 10(b)). By analyzing this histogram we can detect the presence of defect E (FIG. 10(b)) and determine the size and location of the defect by identifying the section.

The number of pixels with gray level 7 in the template image (FIG. 10(a)) was equal to 101 (FIG. 10(d)). The number of pixels with gray level 7 in the superposed image C (FIG. 10(c)) was equal to 77 (FIG. 10(e)). That is why we have now 24 pixels with gray level 16, which represented the area of section 7. Therefore we have only 101−24=77 pixels with gray level 7. Any gray level above the gray level range of 17, i.e., 9+8=17, will indicate a defect. We have 10 pixels at gray level 21. Those are the pixels which related to the defect E and indicate its size. The defect should be found in section 3, i.e., 21−18=3.

Ten pixels with grey level 21 also explain why we have at gray level 12 only 15 pixels. I.e., 98−(15+10)=73. (The histogram of FIG. 10(d) assures that the maximum number of pixels in section 3 are equal 98. FIG. 10(e) indicates that gray level 3 has only 73 pixels, i.e., some of the pixels of section 3 are shifted to other gray levels. We see that 15 pixels are shifted to gray level 12 (FIG. 10(e) and 10 pixels are shifted to gray level 21. (Gray level 3 on image A can be shifted by superposing with images A and B only to gray level 12 or 21).

One can see that by carefully selecting a template and its gray levels, by shifting and quantizing the image, by superposing the product image and the template image, and by creating a histogram of the results of superposition, one can detect, measure, and locate the defects on a finish area.

FIG. 11(a)

Ring Template Image

A code marked on the product's surface can be detected and decoded using the same method as was used for the detection of defects. The code marks are determined with the use of a ring-like template of the type shown in FIGS. 11(a) and 10(a). (For detailed explanations refer to the discussion of FIG. 10(a)).

FIG. 11(b)

Code Image

Figure 11A:
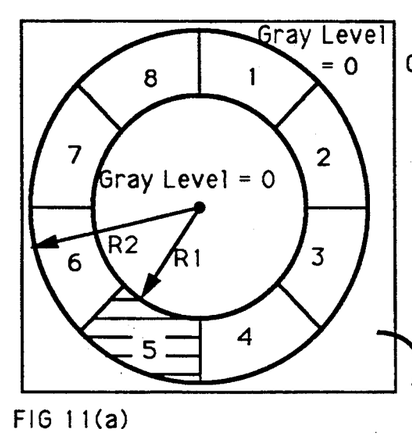
FIG. 11(a) is a diagram showing a ring template related to the invention.
Figure 11B:
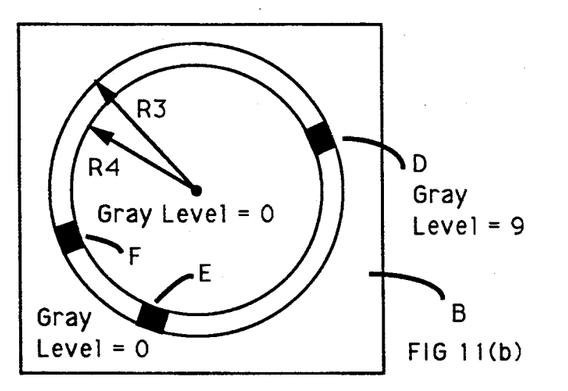
FIG. 11(b) is a diagram showing a code image related to the invention.

FIG. 11(b) shows at B an image of the surface of a product, such as a plastic bottle with a code placed on its bottom end. The code may indicate, e.g., the expiration date of the beverage contained in the bottle. The inspection line detects the code, decodes its value, and sorts it out if the product is too old. In our example, the code is composed of three marks, D, E, and F, which lie between radii R3 and R4. Radius R3 is smaller than radius R1 and R4 is greater than R2. The first shifting of gray levels of product image B is carried out as follows: the background gray level is quantized to gray level zero (0) (as shown in the diagram), and code marks D, E and F are shifted and quantized to be of gray level equal 9 (higher than the ring template's gray levels).

FIG. 11(c)

Superposition of Code Image and Ring Template

Figure 11C:
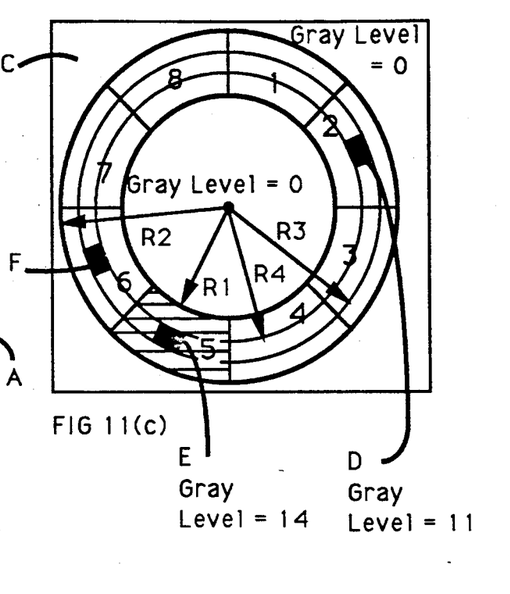
FIG. 11(c) is a diagram showing result of superposition of the code image and the ring template.

FIG. 11(c) shows results of superposition of a template image A (FIG. 11(a)) and product image B of FIG. 11(b). As a result of such superposition, the code marks are expressed as black areas D, E, and F bounded between circles having radii R3 and R4. In a similar manner, the template is expressed as a ring limited between circles having radii R1 and R2, where R2 greater than R3, and R1 is greater than R4. This ring is divided into sections 1 to 8 with gray levels 1 to 8, respectively.

As a result of the superposition, few of the original gray levels 1 to 8 are shifted. E.g.: the originally emphasized section 5 (with all of its pixels of gray level 5) now has fewer pixels of gray level 5, since code mark E absorbed a part of its pixels. The gray level value of mark E on code image B FIG. 11(b) was 9. Now as a result of the superposition, gray level value E becomes 14, i.e., 9+5=14, (gray level 5 on the template image plus gray level 9 on the code image).

The same procedure performed on section 5 leads us to the rest of the gray levels shown in the drawing.

After the superposition, defect area D will be shifted to gray level 11, which is 2+9=11 (gray level 2 on the template image plus gray level 9 on the code image).

FIG. 11(d)

Histogram of Ring Template

Figure 11D:
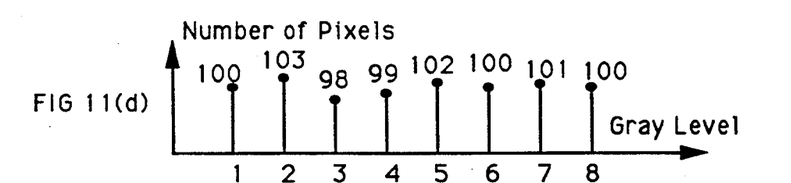
FIG. 11(d) is a diagram showing a histogram of a ring template related to the invention.

FIG. 11(d) shows a histogram of the ring template of FIG. 11(a). As was shown in FIG. 10(d), each template section is composed of a number of pixels. There may be fluctuations in the number of pixels between sections. However these fluctuations will not influence the inspection, since the histogram of the template itself will give the precise number of pixels for each section. As shown in the drawing, the first section with gray level 1 has 100 pixels. The second section with gray level 2 has 103 pixels, and so on.

FIG. 11(e)

Histogram of FIG. 11(c)

Superposition of Images FIG. 10(a) and 10(b)

Figure 11E:
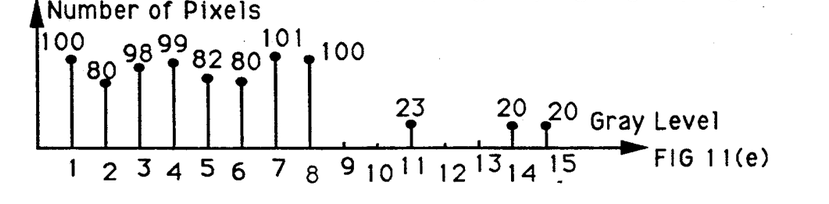
FIG. 11(e) is a histogram of FIG. 11(c) the result of superposition of images of FIGS. 11(a) and 11(b).

The diagram of FIG. 11(e) is the histogram of superposed image C (FIG. 11(c)), i.e., the histogram of superposition of images A and B (FIGS. 11(a) and 11(b)). By analyzing that histogram we will come up with the presence of code marks D, E, and F and the location of the template sections.

The number of pixels with gray level 5 on the template image (FIG. 11(a)) is equal to 102 (FIG. 11(d)). The number of pixels with gray level 5 on the superposed image C (FIG. 10(c)) is equal to 82 (FIG. 10(e)). That is because we have now 20 pixels with gray level 14 (mark E) that absorbed the area of section 5. Therefore we have only 102−20=82 pixels with gray level 5. Any gray level above gray level 9 will indicate a code mark. (Some of the bottles are old and gain scratches with time. Thus it is necessary to distinguish a scratch from a code mark. As long as the number of pixels is within the accuracy of a code mark size, we may assume that it is indeed a code mark and not a scratch).

In the example illustrated in FIG. 10(e) we have a mark with gray level 14 and a size corresponding to 20 pixels. This mark is located in section 5, i.e., 14−9=5. The location of the mark is very important for decoding the code value, and this method give us a very fast indication of the location. In our example the value of the code in a binary form will be as follows: 01001100. The first zero indicates that there is no mark in section number 1. The first 1 indicates that there is a mark in section number 2, and so on for the rest of the code. Gray level 11 with 23 pixels indicates a code mark D, and gray level 15 with 20 pixels indicates a code mark F.

FIG. 12

Product Inspection System

Figure 12:
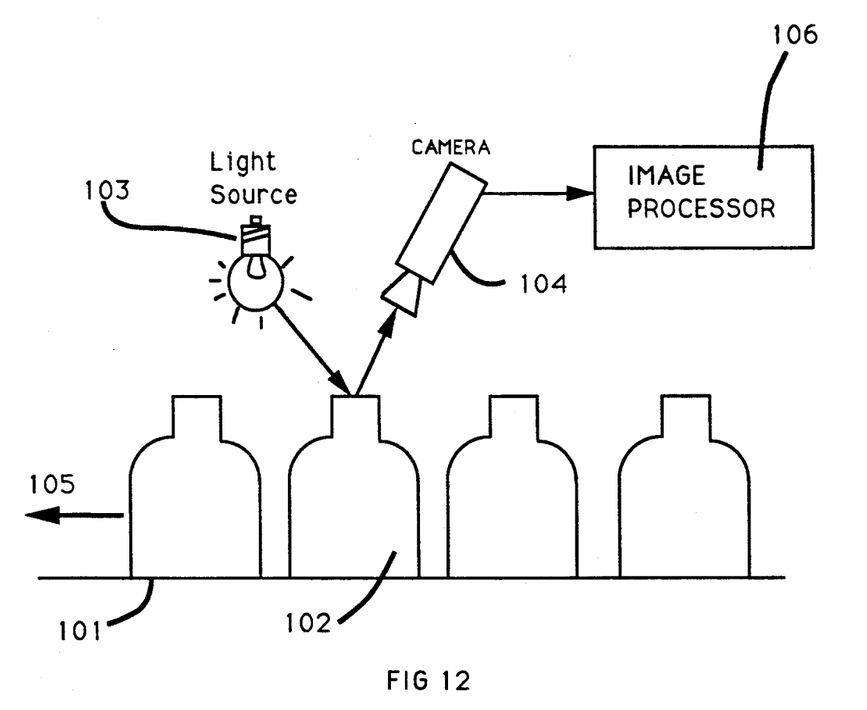
FIG. 12 is a schematic view of a quality-control system.

FIG. 12 is a general schematic configuration of the entire system for carrying out the method of the invention. Bottles to be inspected, such as bottles 102, move on a conveyor 101 in direction 105. The bottles are illuminated by a light source 103, and their images are taken by a sensor 104, which in fact is an industrial camera. The image is saved in memory, which is a part of image processor 106, such as the one produced by Imaging Technology Inc., Woburn, Mass., Model 150/151.

Processor 106 is composed of several memory boards (not shown). Each board is large enough to save images. The images that are stored are the template image, the product image, and the result of the superposition process, i.e., the superposed images. Processor 106 also includes hardware lookup tables (not shown). Those tables are reused for shifting and quantizing the image gray levels according to pre-loading converting table at the startup cycle of the precessor or the algorithm. An example of a shift table is: (1,11), (2,12), (3,13). That means all the original gray levels in table with values 1, 2, and 3 are shifted up by a value of 10. An example for quantizing table is: (4,60), (5,60), (6,60). That means a set of original gray levels 4, 5, and 6 are converted to the value 60.

Processor 106 also contains a hardware board (not shown) which includes a microprocessor for calculating the histograms of images while they are saved in the memory. The motherboard of the processor unit includes a very fast computer, such as a Motorola 68040 microprocessor and an on-board RAM. This board includes an algorithm for processing the histogram vector values and the inspection decisions. Hardware systems like this are on the market today and are produced, e.g., by Imaging Technology Inc., supra.

When the system is switched on, the algorithm stored in the processing unit creates a template which is saved in the memory. The histogram of the template is evaluated and also is saved in memory. Then the lookup tables are loaded with the shifting and the quantizing function. At that stage the image processing unit is endlessly looping, while waiting to obtain a product image from camera 104. An image is sent to processor 106 when product 102 crosses light source 103. The lookup tables shift the gray levels of the product image before saving takes place. Processor 106 superpositions the product image and the template image. The histogram hardware board then evaluates the histogram of the result and saves it in memory as a vector. Finally the algorithm analyzes the histogram vectors to decide dimensions, defect locations, and code values.

FIG. 13

Image of Product with Surface Defects

Figure 13:
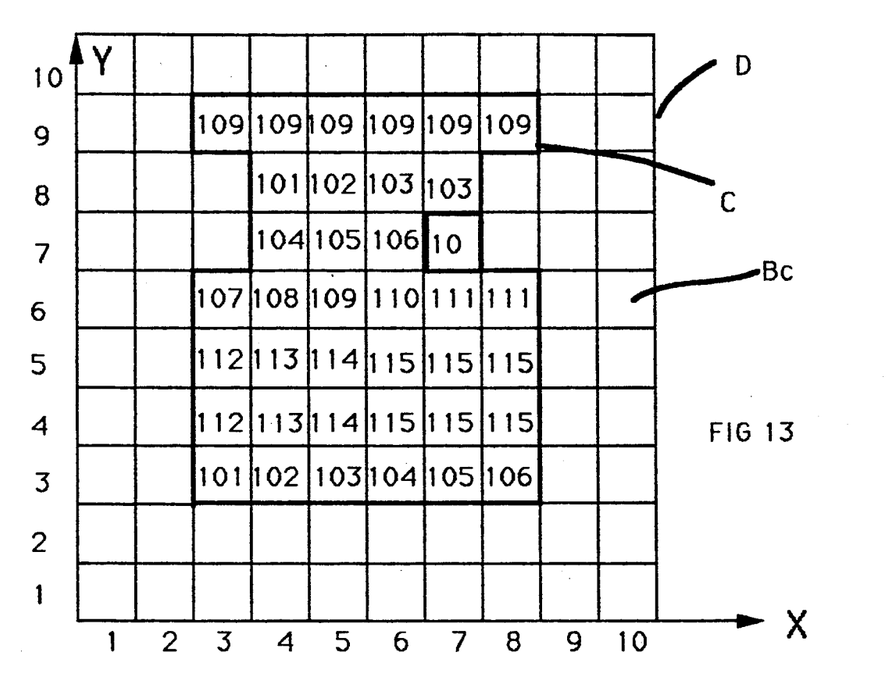
FIG. 13 is a pixel-based representation of an image of a product with a surface defect related to the invention.

FIG. 13 shows an image D of a bottle or container C, as was shown in FIG. 2. Assume now that there is a defect of one pixel size on the surface at address (7,7). The defect is distinguished from its surrounding by having a low gray level of 10. The rest of the gray levels on the image are exactly like those on FIG. 2. The defect can be a result of dirt or a piece of paper that was glued to the surface and was not washed off in the cleaning process of the bottle.

FIG. 14

Quantizing of Gray Levels of Image of Product

Figure 14:
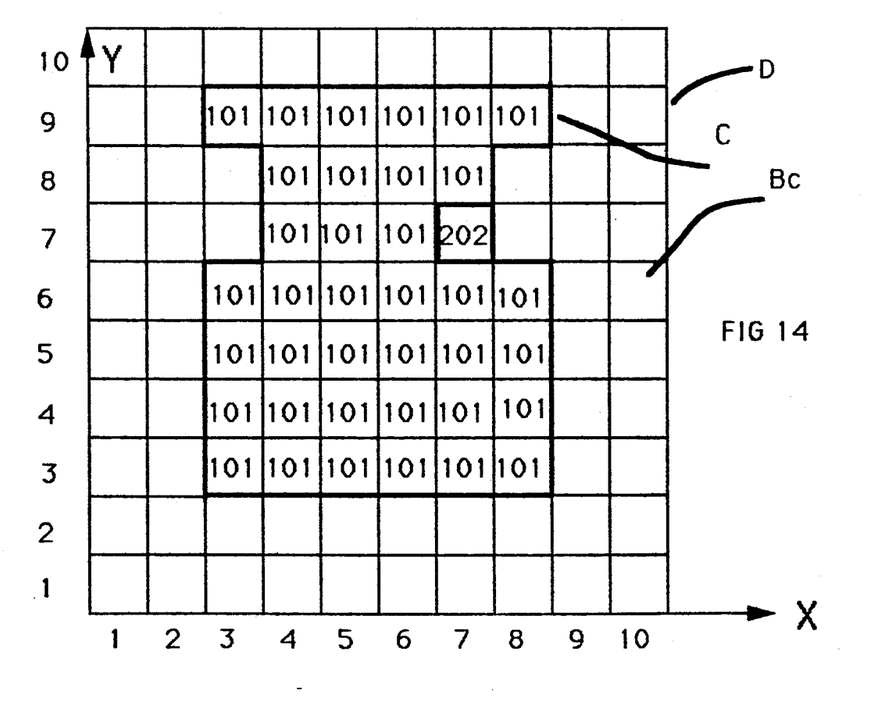
FIG. 14 is diagram showing a shift of gray levels of the image of FIG. 13.

FIG. 14 shows the modified product image of FIG. 13 after its gray levels have been quantized. All gray levels between 101 and 109 are converted and represented now by gray level 101. Gray levels 1 to 10 are converted and represented now by gray level 202. Gray level 101 was selected to be higher than 100, the highest gray level on the image template. The value 202 was selected to be higher than 201, i.e., (100+101). The gray level on background Bc is not changed and is at zero (0).

This quantizing step is not limited to a one-time step. The process can be repeated a plurality of time. E.g., if there were other defects or marks (not shown) on the products expressed in gray levels between 30 to 40, then the second quantizing converts those gray levels defects in the product image to value 303.

This value was obtained by converting the gray level of product image (30 to 40) to a gray level, (303), which is higher than the sum of highest template gray level (100) and the highest gray level obtained in a preceding quantizing step (202), i.e., 303 is higher than 100+202.

That can be repeated plurality of times. The conversion of an image gray level can be by shifting process, by quantizing one time or a plurality of times, or any combination of the above.

FIG. 15

Superposition of Product and Template Images

Figure 15:
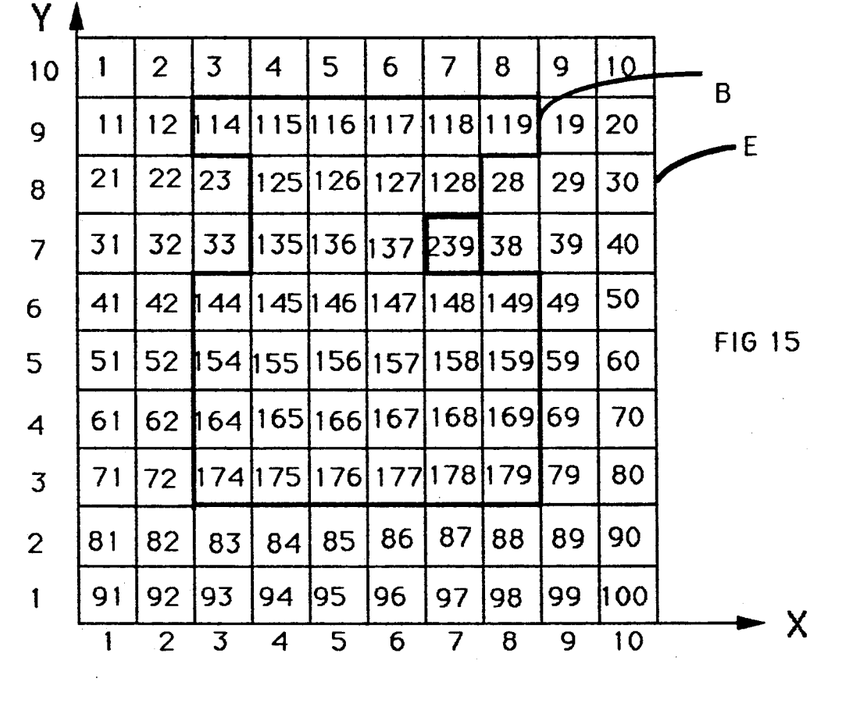
FIG. 15 is a diagram showing result of superposition of the image of the product of FIG. 13 and the template image of FIG. 1.

FIG. 15 shows the result of the superposition of the product image of FIG. 14 onto the template image of FIG. 1. Any gray level higher than 203, i.e., value (1+202) and less than 302, i.e., value (100+202), will indicate defects with gray levels of original range of 1 to 10.

FIG. 16

Histogram of FIG. 15.

Figure 16:
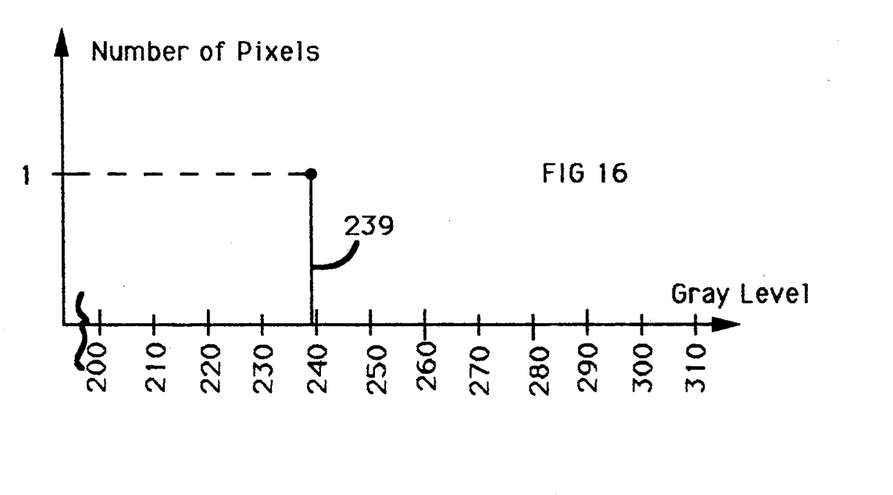
FIG. 16 is a histogram of the image of FIG. 15.

FIG. 16 shows the upper range of the histogram of FIG. 15. A range higher than 203 indicates the presence of defects. As we see, there is one pixel in the histogram at gray level 239. This indicates that gray level 37 on the template, i.e., value (237−202), was shifted by superposition. On the template, gray level 37 is at address (7,7), which is the place where the defect is located. We see that by analyzing the top portion of the histogram vector one can detect the existing of a defect and its location on the product.

SUMMARY, RAMIFICATIONS, AND SCOPE

Accordingly the reader will see that, according to the invention we have provided a technique that will enable the detection of defects on static or moving products by analyzing their images. This technique enables us to measure with great accuracy a product's dimensions and therefore fluctuations in such dimensions. The defects can be detected on a part of or on the full surface of the product. Surface detects can also be detected, sized, and mapped. The technique is much faster than methods use in the prior art. A template is a primary part of the technique and its gray levels and shape are carefully selected and stored in the memory of the computer for use in real time. Careful shifting and quantizing of the image's gray levels are done to provide satisfactory results upon superposition of the image with the template. Analysis of the histograms built on the results of superposition enables the detection of deviations in the product's dimensions and surface defects.

While the above description contains many specific details, these should not be construed as limitations on the scope of the invention, but as exemplifications of the presently preferred embodiments thereof. Many other ramifications and variations are possible within the teachings to the invention.

For example, defects on products can be determined by measuring the volume of a product as a result of measuring its dimensions. Instead of surface defects on a product, artificial marks forming a code on the surface of the product can be detected and decoded. Other examples are the detection of missing parts of a complicated product on an assembly line or the number of balls in a ball bearing. The sensitivity of the system can be adjusted by varying the intensity of the light source, the sensitivity of the sensors, or by using several light sources with different colors (wavelengths). The border the spectrum of the light the better the ability to detect defects that may not be shown on the image with a narrower light spectrum. The hardward described is but an example and can be changed. Products other then bottles, ball bearings, etc., can be inspected.

Therefore, the scope of the invention should be determined, not by examples given, but by the appended claims and their legal equivalents.

We claim:

1. A method for inspecting products which may have defects or marks and move on a production line, with the use of a sensor and a processing unit with a memory, comprising:
   providing and saving in said memory a computer-generated artificial template image with a plurality of preselected gray levels;
   creating a histogram vector of said template image;
   creating a product image by sensing one of said products with said sensor,
   said product image comprising a multiplicity of pixels with intensity levels expressed as respective gray levels;
   modifying said product image to produce a modified product image by increasing the value of said gray levels of said product image by adding a constant value to all of said respective gray levels of said product image so as to make said gray levels of said modified product image higher than said grey levels of said template; and
   inspecting said product by superimposing said template image onto said modified product image, thereby creating a superposed image.

2. The method of claim 1, where said superposing is produced by summing gray levels assigned to memory locations of said product image and said template image, and saving the results of the summation in said memory.

3. The method of claim 2, further including creating of a histogram vector of said superposed image.

4. The method of claim 3, further including analyzing said histogram vector of said superposed image by its discontinuities to indicate dimensions in numbers of pixels.

5. The method of claim 3, further including analyzing any new gray levels values which appeared in said histogram vector of said superposed image and were absent in said histogram of said template image.

6. The method of claim 3, further including comparing values of said histogram vector of said superposed image with that of said histogram vector of said template image.

7. The method of claim 3, further including counting the number of pixels equal to said gray level in said histogram vector.

8. The method of claim 3, further including analyzing said histogram vector of said superposed image by its discontinuities to detect, size and map said defects in numbers of pixels.

9. The method of claim 3, further including analyzing said histogram vector of said superposed image by its discontinuities to detect marks and express their size in numbers of pixels.

10. The method of claim 3, further including noting those of said products which have at least one said defect beyond a predetermined limit.

11. The method of claim 1, further include analyzing said histogram vector of said template image by its discontinuities to indicate dimensions of products expressed in numbers of pixels.

12. The method of claim 1 wherein said method is applied to detect, size, map, and decode code marks on the surface of said product.

13. The method of claim 1 wherein said method is applied to measure dimensions of said products.

14. The method of claim 1 wherein said method is applied to detect, size, map, and locate said defects on said products' surfaces.

15. The method of claim 1 wherein said method is applied to detect, size, map, and locate said defects on a threaded portion of said product.

16. The method of claim 1 wherein said method is applied to detect, size, map, and locate of said defects on a finished portion of said product.

17. The method of claim 1 wherein said method is applied to detect, size, map, and locate of said defects on a base portion of said product.

18. The method of claim 1 wherein said template image is composed of rectangular areas of different gray levels and a number of pixels.

19. The method of claim 1 wherein said template image is composed of a ring divided into plurality of sections, where each section has a different gray level represented by number of pixels.

20. The method of claim 1 wherein said template image is composed of a plurality of parallel strips, where each strip has a different gray level of any number of pixels.

21. The method of claim 1 wherein said products are bottles.

22. The method of claim 21 wherein said bottles are plastic bottles.

23. The method of claim 21 wherein said bottles are glass bottles.

24. The method of claim 1 wherein said products are transparent.

25. The method of claim 1 wherein said products are non-transparent.

26. The method of claim 1 wherein said inspecting includes measuring the height of said products.

27. The method of claim 1 wherein said inspecting includes measuring the width of said products.

28. A method for inspecting products which may have defects or marks and move on a production line, with the use of a sensor and a processing unit with a memory, comprising:

providing and saving in said memory a template image with a plurality of preselected gray levels;

creating a histogram vector of said template image;

creating a product image comprising a multiplicity of pixels with intensity levels expressed as respective gray levels; and modifying said product image to provide a modified product image by quantizing said gray levels of said product image, said quantizing being performed by converting said gray levels of said product image to a gray level which is higher than the highest one of said gray levels of said template; and inspecting said product by superimposing said template image onto said modified product image, thereby creating a superposed image.

29. The method of claim 28, further including mofifying said product image by repeating said quantizing in a plurality of steps and converting, in each step, said gray level of said product image to a gray level which is higher than the sum of said highest template gray level and the highest gray level obtained in a preceding said quantizing step.

* * * * *